United States Patent
Yamazaki et al.

(10) Patent No.: US 9,582,169 B2
(45) Date of Patent: Feb. 28, 2017

(54) DISPLAY DEVICE, DISPLAY METHOD, AND PROGRAM

(71) Applicant: NTT DOCOMO, INC., Tokyo (JP)

(72) Inventors: Hitoshi Yamazaki, Tokyo (JP); Haruhiko Sugisaki, Tokyo (JP); Seiji Shiraishi, Tokyo (JP); Daisuke Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 145 days.

(21) Appl. No.: 14/391,548

(22) PCT Filed: Jun. 3, 2013

(86) PCT No.: PCT/JP2013/065410
§ 371 (c)(1),
(2) Date: Oct. 9, 2014

(87) PCT Pub. No.: WO2013/183608
PCT Pub. Date: Dec. 12, 2013

(65) Prior Publication Data
US 2015/0106769 A1   Apr. 16, 2015

(30) Foreign Application Priority Data

Jun. 7, 2012  (JP) .................................. 2012-129625

(51) Int. Cl.
*G06F 3/048*  (2013.01)
*G06F 3/0484*  (2013.01)
(Continued)

(52) U.S. Cl.
CPC .......... *G06F 3/04845* (2013.01); *G06F 3/013* (2013.01); *G06F 3/038* (2013.01);
(Continued)

(58) Field of Classification Search
CPC ............. G06F 3/017; G06F 2203/0381; G06F 2203/04806; G06F 3/011-3/013;
(Continued)

(56) References Cited

U.S. PATENT DOCUMENTS

| | | | |
|---|---|---|---|
| 2006/0187240 A1 | 8/2006 | Araki et al. | |
| 2008/0165141 A1* | 7/2008 | Christie | G06F 3/044 345/173 |
| 2011/0258563 A1* | 10/2011 | Lincke | G06F 17/30905 715/760 |
| 2013/0169560 A1* | 7/2013 | Cederlund | G06F 3/013 345/173 |

FOREIGN PATENT DOCUMENTS

| | | |
|---|---|---|
| JP | 05-073205 A | 3/1993 |
| JP | 10-039995 | 2/1998 |
| WO | 2009084809 A1 | 7/2009 |

OTHER PUBLICATIONS

PCT International Search Report issued in International Application No. PCT/JP2013/065410, date mailed Jul. 30, 2013, pp. 1-2.
(Continued)

*Primary Examiner* — Claudia Dragoescu
(74) *Attorney, Agent, or Firm* — MKG, LLC

(57) ABSTRACT

A position of first cursor changes according to a position of thumb. A position of second cursor changes according to a visual line of a user. If a position of first cursor remains unchanged over a predetermined time period, the position of first cursor is fixed. If a distance between first cursor and second cursor has become longer, image G1 on display other than first cursor or second cursor is enlarged. If a distance between first cursor and second cursor has become shorter, image G1 on display other than first cursor or second cursor is reduced.

7 Claims, 9 Drawing Sheets

(51) Int. Cl.
    *G06F 3/0488* (2013.01)
    *G06F 3/0481* (2013.01)
    *G06F 3/038* (2013.01)
    *G06F 3/01* (2006.01)
    *G06F 3/0346* (2013.01)
(52) U.S. Cl.
    CPC .......... *G06F 3/0346* (2013.01); *G06F 3/0488* (2013.01); *G06F 3/04812* (2013.01); *G06F 3/04883* (2013.01)
(58) Field of Classification Search
    CPC .......... G06F 3/048–3/0488; G06F 2200/1614; G06F 2200/1637; G06F 2203/04808
    See application file for complete search history.

(56) References Cited

OTHER PUBLICATIONS

Extended European Search Report for European Patent Application No. 13801325.5-1972/2860618 PCT/JP2013065410, dated Jan. 29, 2016.
Nagamatsu et al., MobiGaze: Development of a Gaze Interface for Handheld Mobile Devices, CHI 2010: Work-in-Progress. Apr. 10-15, 2010, Atlanta, GA USA.
First Office Action issued in corresponding Chinese Patent Application No. 201380003424.7, dated Apr. 6, 2016, pp. 1-10.
Second Office Action issued in corresponding Chinese Patent Application No. 201380003424.7, dated Dec. 13, 2016, pp. 1-10.

\* cited by examiner ical field

The present invention relates to a user interface.

BACKGROUND ART

JP5-73205A1 discloses an invention relating to a user interface using a visual line. According to the invention, a position on a display screen viewed by a user is detected, and a cursor is displayed at the detected position. Further, a position of a cursor is detected as point A when a button is pressed, another position of the cursor is detected as point B when the cursor is moved from point A and the button is pressed again, and an area of a circle, which is centered at point A and has a radius of a distance between point A and point B, is enlarged.

In a computer device having a touch screen, such as a tablet terminal, a user is able to enlarge or reduce an image by performing a pinch-close or pinch-open operation on the touch screen. However, in a situation where a user holds a tablet terminal with one hand, and the other hand is not free, s/he is not able to touch the touch screen with a finger other than a thumb, whereby it is difficult to perform an enlarging or reducing operation. In this situation, if the invention described in JP5-73205A1 is employed, the user is able to enlarge an image in the tablet terminal since pressing a button can be performed using one finger. However, it is necessary that such a button be available when the invention of JP5-73205A1 is employed. When a user holds a tablet terminal with one hand, s/he may hold it upright or horizontally; accordingly, a button is not necessarily positioned near a finger of the hand holding the tablet terminal, whereby the button cannot be pressed by a finger of the one hand holding the tablet to enlarge an image.

SUMMARY

The present invention has been made in view of the foregoing background, and an object of the present invention is to enable a user to operate a displayed image without using more than one finger.

To address the problem, an aspect of the present invention provides a display device, comprising: a display unit having a display surface on which an image is displayed; a detecting unit that detects a visual line of a user; an identifying unit that identifies a position on the display surface touched by the user; a first control unit that causes the display unit to display a first cursor at a position corresponding to the position identified by the identifying unit; a second control unit that causes the display unit to display a second cursor at a position corresponding to the visual line detected by the detecting unit; and a third control unit that, when a distance between the position of the first cursor and the position of the second cursor has become longer, causes the display unit to enlarge an image, other than the first cursor or the second cursor, displayed by the display unit, and when the distance has become shorter, causes the display unit to reduce an image, other than the first cursor or the second cursor, displayed by the display unit.

In a preferred aspect of the present invention, a degree of the enlargement or reduction may change depending on a content of the image, other than the first cursor or the second cursor, displayed by the display unit.

Another aspect of the present invention provides a display device, comprising: a display unit having a display surface on which an image is displayed; a detecting unit that detects a visual line of a user; an identifying unit that identifies a position on the display surface touched by the user; a first control unit that causes the display unit to display a first cursor at a position corresponding to the position identified by the identifying unit; a second control unit that causes the display unit to display a second cursor at a position corresponding to the visual line detected by the detecting unit; and a third control unit that, in a case where the position of the first cursor or the second cursor is fixed, and a direction of the other cursor, as viewed from the fixed cursor, has changed, causes the display unit to display an image other than the first cursor or the second cursor, which image has been rotated according to an angle between a direction of the other cursor as viewed from the fixed cursor prior to the change, and a direction of the other cursor as viewed from the fixed cursor subsequent to the change.

Another aspect of the present invention provides a display method, comprising the steps of: detecting a visual line of a user; identifying a position on a display surface, on which an image is displayed, of a display unit, which position has been touched by a user; causing the display unit to display a first cursor at a position corresponding to the identified position; causing the display unit to display a second cursor at a position corresponding to the detected visual line; and when a distance between the position of the first cursor and the position of the second cursor has become longer, causing the display unit to enlarge an image, other than the first cursor or the second cursor, displayed by the display unit, and when the distance has become shorter, causing the display unit to reduce an image, other than the first cursor or the second cursor, displayed by the display unit.

Another aspect of the present invention provides a display method, comprising the steps of: detecting a visual line of a user; identifying a position on a display surface, on which an image is displayed, of a display unit, which position has been touched by a user; causing the display unit to display a first cursor at a position corresponding to the identified position; causing the display unit to display a second cursor at a position corresponding to the detected visual line; and in a case where the position of the first cursor or the second cursor is fixed, and a direction of the other cursor, as viewed from the fixed cursor, has changed, causing the display unit to display an image other than the first cursor or the second cursor, which image has been rotated according to an angle between a direction of the other cursor as viewed from the fixed cursor prior to the change, and a direction of the other cursor as viewed from the fixed cursor subsequent to the change. Another aspect of the present invention provides a program for causing a computer to execute the steps of: detecting a visual line of a user; identifying a position on a display surface, on which an image is displayed, of a display unit, which position has been touched by a user; causing the display unit to display a first cursor at a position corresponding to the identified position; causing the display unit to display a second cursor at a position corresponding to the detected visual line; and when a distance between the position of the first cursor and the position of the second cursor has become longer, causing the display unit to enlarge an image, other than the first cursor or the second cursor, displayed by the display unit, and when the distance has become shorter, causing the display unit to reduce an image, other than the first cursor or the second cursor, displayed by the display unit.

Another aspect of the present invention provides a program for causing a computer to execute the steps of: detecting a visual line of a user; identifying a position on a display surface, on which an image is displayed, of a display unit, which position has been touched by a user; causing the display unit to display a first cursor at a position corresponding to the identified position; causing the display unit to display a second cursor at a position corresponding to the detected visual line; and in a case where the position of the first cursor or the second cursor is fixed, and a direction of the other cursor, as viewed from the fixed cursor, has changed, causing the display unit to display an image other than the first cursor or the second cursor, which image has been rotated according to an angle between a direction of the other cursor as viewed from the fixed cursor prior to the change, and a direction of the other cursor as viewed from the fixed cursor subsequent to the change.

According to the present invention, a user is able to operate a displayed image without using more than one finger.

DETAILED DESCRIPTION

[Embodiment]
(Hardware Configuration)

Figure 1:
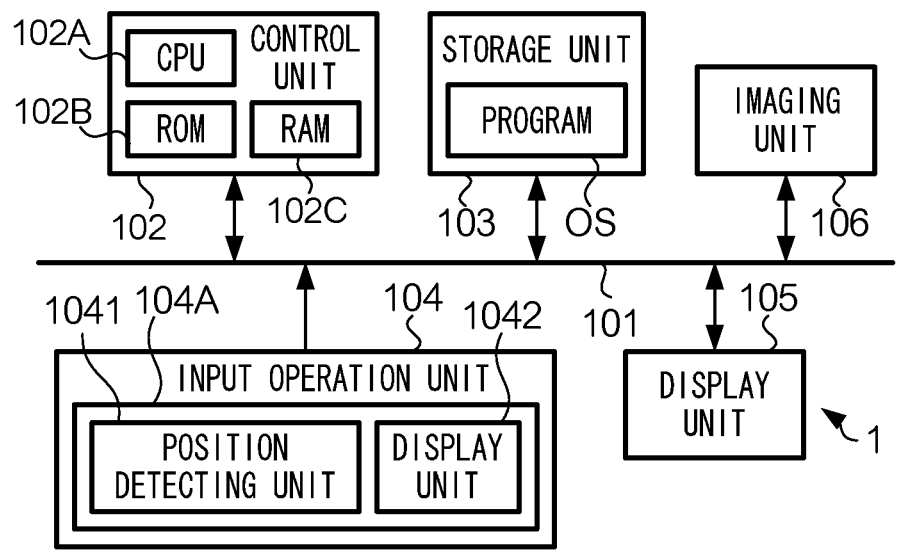
FIG. 1 is a diagram showing a hardware configuration of information-processing device 1.

FIG. 1 is a diagram showing a hardware configuration of information-processing device 1 according to an embodiment of the present invention. Information-processing device 1 according to the present embodiment is a computer device including a touch screen and hardware buttons, which is referred to as a "tablet terminal." The touch screen and the hardware buttons are provided at a plate-like casing. Information-processing device 1 is an example of a display device that displays an image on a touch screen. The units of information-processing device 1 are interconnected via bus 101, as shown in FIG. 1.

Communication unit 105 has a function of a communication interface that performs wireless communication. Information-processing device 1 controls communication unit 105 to connect to a wireless LAN (Local Area Network) or a mobile communication network, via which the device performs data or voice communication. Input operation unit 104 includes plural hardware buttons for operating information-processing device 1. Input operation unit 104 also includes touch screen 104A, which includes an integrated combination of display unit 1042 and position detecting unit 1041. Display unit 1042 is an example of a display means for displaying an image. Position detecting unit 1041 is provided on a surface of display unit 1042. Position detecting unit 1041 transmits an image displayed by display unit 1042, and detects a position touched by a finger. Display unit 1042 may be a liquid crystal display, an organic EL (Electro Luminescence) display, or any other display. Position detecting unit 1041 may be a sensor such as a capacitance type sensor, which detects positions touched by more than one finger.

Imaging unit 106 includes a lens and a solid-state imaging sensor, and generates data representing an image formed in the solid-state imaging sensor by the lens.

Storage unit 103 includes a non-volatile memory. Storage unit 103 stores program OS for providing an operating system, and a variety of application programs. Control unit 102 includes CPU (Central Processing Unit) 102A, ROM (Read Only Memory) 102B, and RAM (Random Access Memory) 102C. When CPU 102A executes an IPL (Initial Program Loader) stored in ROM 102B, program OS stored in storage unit 103 is executed so that the operating system is provided. As a result, the variety of application programs becomes executable. In the present embodiment, after the operating system is provided, a user interface using touch screen 104A and imaging unit 106 is provided.

(Description of Functional Block)

Figure 2:
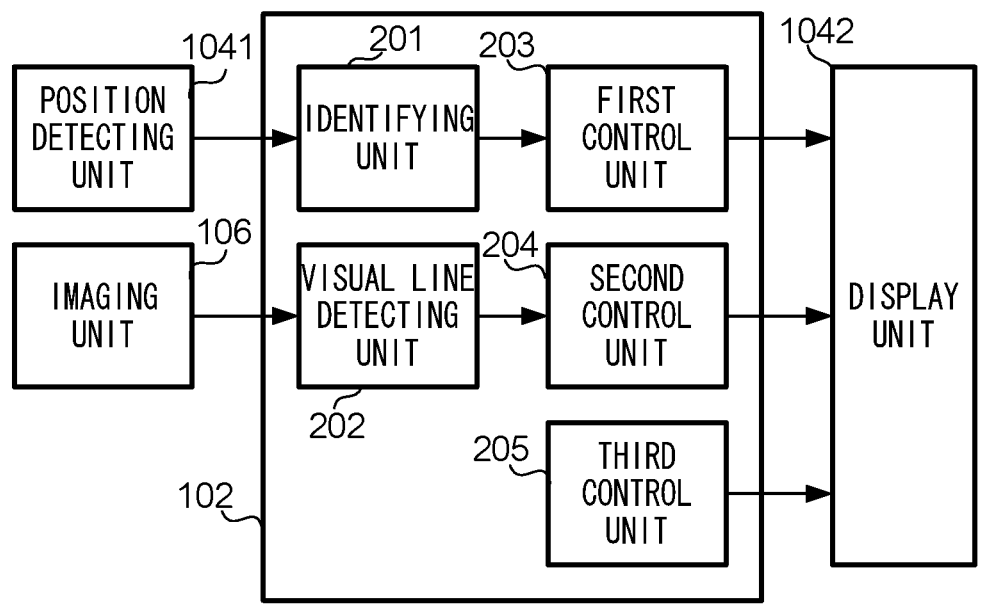
FIG. 2 is a block diagram showing functions of information-processing device 1.

FIG. 2 is a block diagram showing functions provided by control unit 102, which are characteristics of the present invention. In the present embodiment, a user interface using touch screen 104A and imaging unit 106 is provided, as described above. FIG. 2 is a block diagram showing functions relevant to the user interface function.

Identifying unit 201 identifies a position on position detecting unit 1041 touched by a user's finger. Identifying unit 201 acquires position data generated in position detecting unit 1041. The position data indicates a position on a display surface of display unit 1042, which has been touched by a user's finger. Identifying unit 201 identifies the position touched by the user's finger based on the position data.

Visual line detecting unit 202 detects a user's visual line. Visual line detecting unit 202 acquires an image showing a user's face. Visual line detecting unit 202 detects a user's visual line based on the acquired face image.

First control unit 203 causes display unit 1042 to display first cursor 10 (described later) at a position identified by identifying unit 201.

Second control unit 204 causes display unit 1042 to display second cursor 11 (described later) at a position corresponding to a visual line detected by visual line detecting unit 202.

Third control unit 205, when a distance between a position of first cursor 10 and a position of second cursor 11 has become longer, causes display unit 1042 to enlarge an image, other than first cursor 10 or second cursor 11, displayed on display unit 1042. Third control unit 205 also, when the distance has become shorter, causes display unit 1042 to reduce an image, other than first cursor 10 or second cursor 11, displayed on display unit 1042.

(Example Operation of Embodiment)

Figure 3:
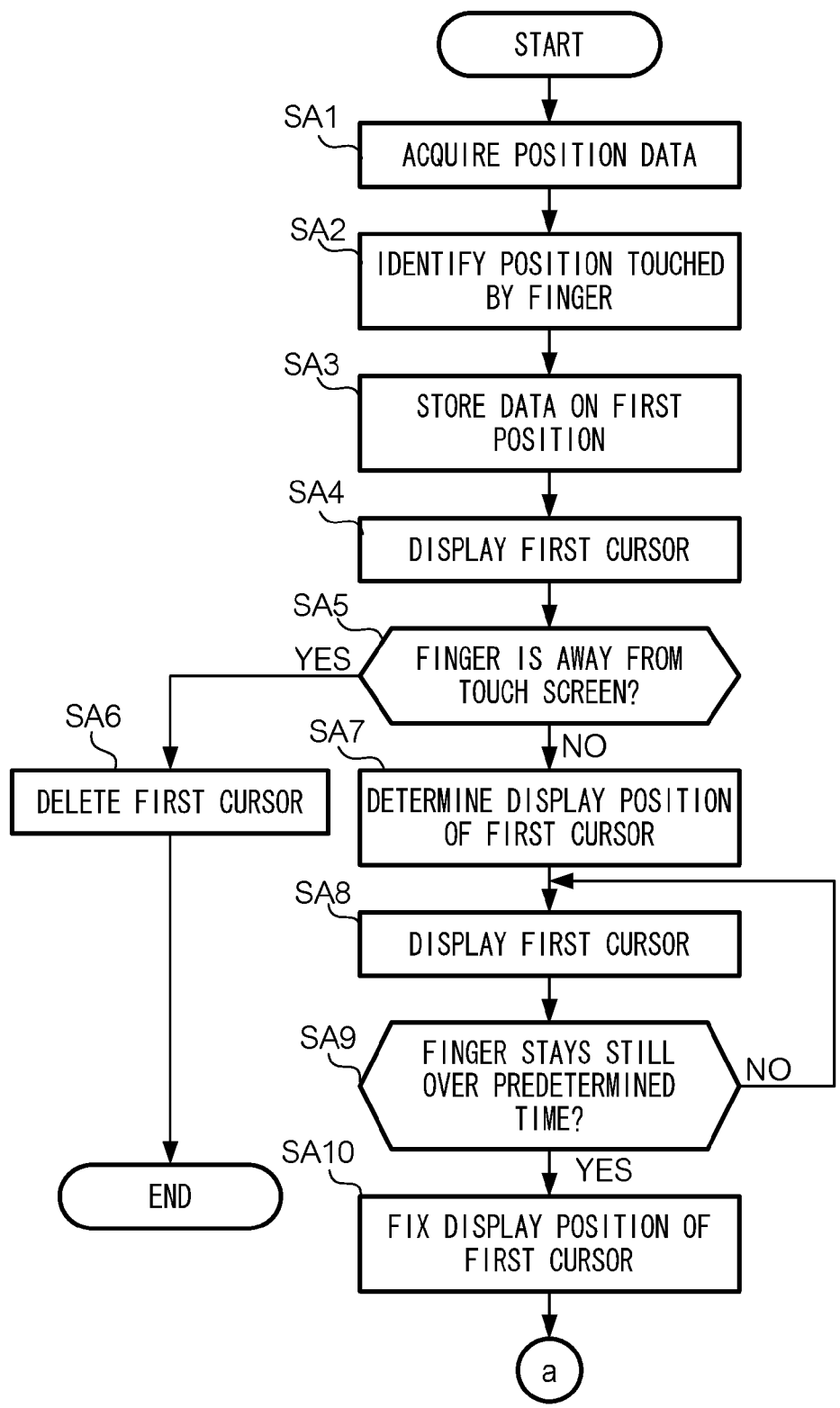
FIG. 3 is a flowchart showing a flow of processing performed by control unit 102.
Figure 4:
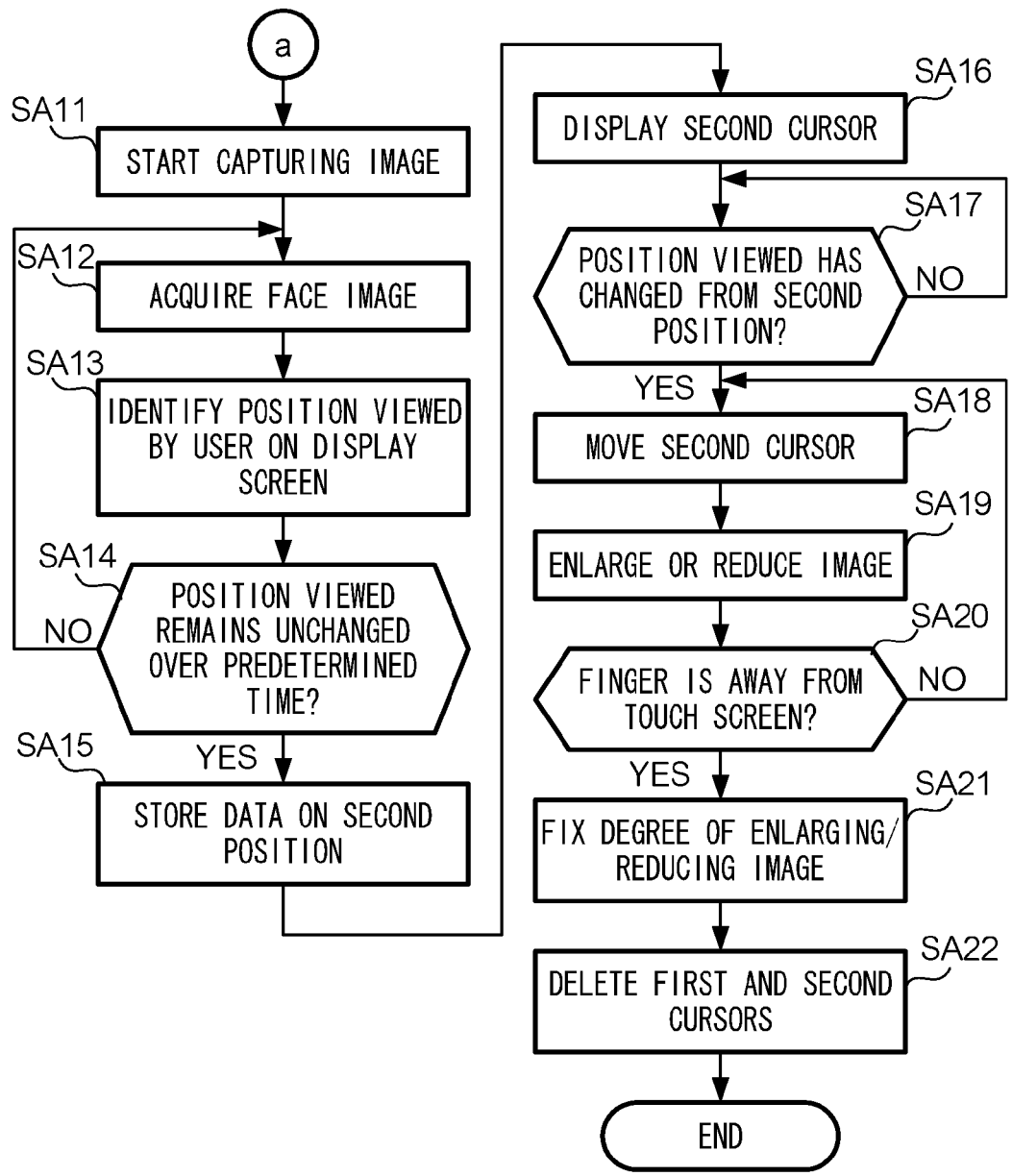
FIG. 4 is a flowchart showing a flow of processing performed by control unit 102.
Figure 5:
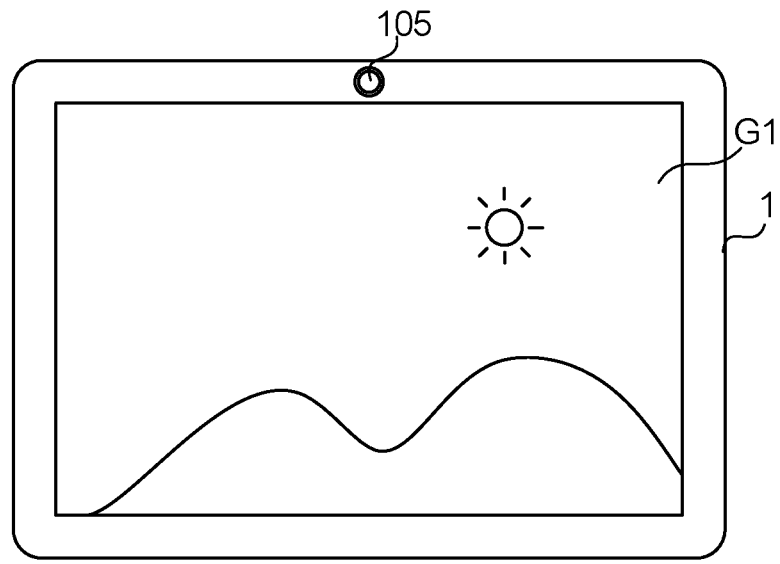
FIG. 5 is a diagram showing an example of a screen image displayed on display unit 1042.

An example of an operation of the present embodiment will be described with reference to flowcharts shown in FIGS. 3 and 4, and example screen images shown in FIGS. 5 to 10. FIG. 5 shows an example of a screen image displayed when an application program is executed in information-processing device 1 for displaying an image. The screen image is displayed full-screen in a display area for the application program. The screen image is image G1, which has been selected by a user.

Figure 6:
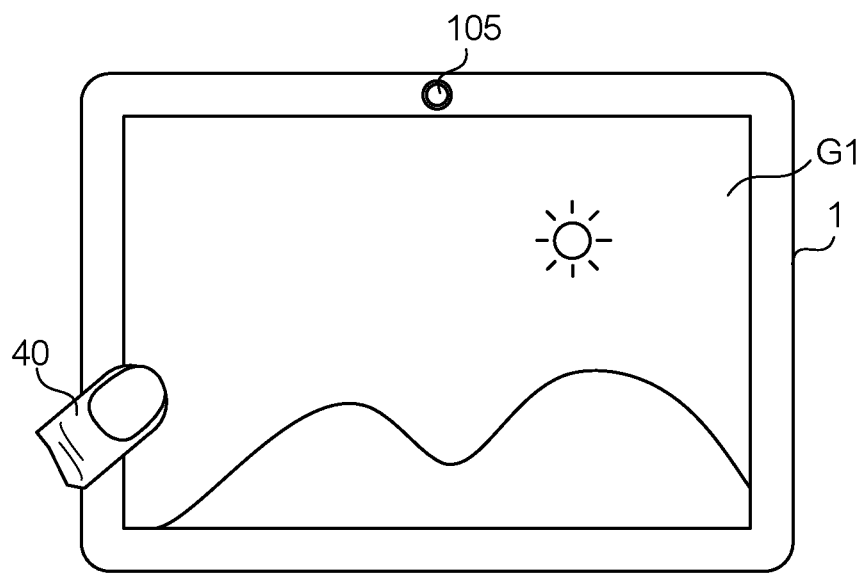
FIG. 6 is a diagram showing an example of a screen image displayed on display unit 1042.

In a situation where first cursor 10 (described later) is not displayed, as shown in FIG. 5, if a user touches touch screen 104A with his/her thumb 40 of the left hand holding information-processing device 1, as shown in FIG. 6, control unit 102 starts a processing shown in FIGS. 3 and 4. Initially, position detecting unit 1041 generates position data indicating a position touched by the finger, and control unit 102 acquires the position data (FIG. 3: step SA1). After acquiring the position data, control unit 102 identifies the position on the display screen touched by the finger (step SA2).

Figure 7:
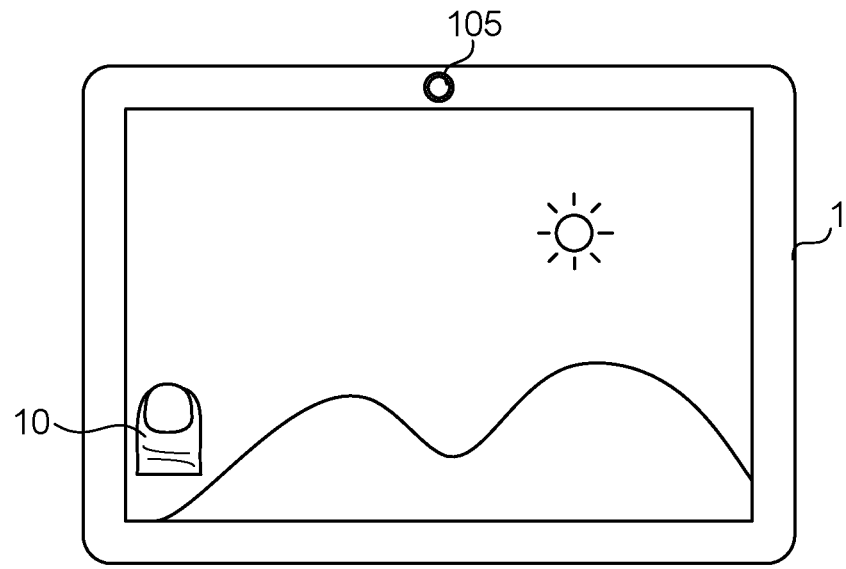
FIG. 7 is a diagram showing an example of a screen image displayed on display unit 1042.

Subsequently, control unit 102 stores data on the position (hereinafter referred to as "first position") identified at step SA2 in RAM 102C (step SA3). Control unit 102 also causes display unit 1042 to display first cursor 10 at the position identified at step SA2 (step SA4). After the processing of step SA4 is carried out, first cursor 10 having a shape of a thumb is displayed at the position of thumb 40 as shown in FIG. 7. It is to be noted that in FIG. 7, thumb 40 is not shown, to avoid making the figure complicated. In the present embodiment, first cursor 10 has a shape of a finger; however, first cursor 10 may have any other shape, such as an arrow.

After first cursor 10 is displayed, control unit 102 determines whether the finger is in touch with touch screen 104A. In a case where position data is not provided from touch screen 104A, and therefore cannot be acquired, control unit 102 determines that the finger that had touched touch screen 104A has moved away from touch screen 104A (step SA5; YES). When making the positive determination at step SA5, control unit 102 causes display unit 1042 to delete first cursor 10 (step SA6).

On the other hand, when position data continues to be provided from touch screen 104A, and is acquired by control unit 102, the control unit makes a negative determination at step SA5, and determines a display position of first cursor 10 based on data indicated by the acquired position data and the stored first position (step SA7).

Specifically, control unit 102 calculates a length of a line connecting the position indicated by the acquired position data and the first position, and calculates a value by multiplying the calculated length by predetermined coefficient α. For example, if coefficient α is "10," and the calculated length of the line is 10 mm, the resultant value is 100 mm. Subsequently, control unit 102 identifies a position, as a display position of first cursor 10, which position is on a line passing through the position indicated by the acquired position data and the first position, and which position is separated in a direction in which the finger has moved, from the first position by a distance of the calculated value.

Figure 8:
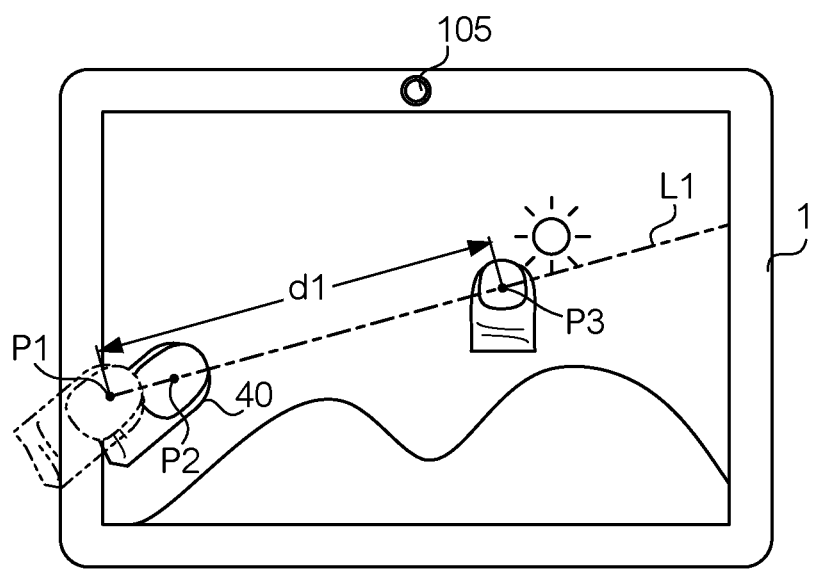
FIG. 8 is a diagram showing an example of a screen image displayed on display unit 1042.

For example, in FIG. 8, thumb 40, which is located at the first position, is shown by a dashed line, and thumb 40, which has moved, is shown by a solid line. When thumb 40 is moved from position P1 to position P2, position P3 is identified as a display position of first cursor 10, which position is on line L1 connecting position P1 and position P2, and which position is separated from the first position by distance dl, which is obtained by multiplying a distance between position P1 and position P2 by coefficient α. After determining a display position of first cursor 10, control unit 102 causes display unit 1042 to display first cursor 10 at the determined display position as shown in FIG. 8 (step SA8).

Subsequently, control unit 102 monitors positions indicated by position data acquired from touch screen 104A. When positions indicated by position data remain unchanged over a predetermined time; namely, the position of thumb 40 remains unchanged over a predetermined time (step SA9; YES), control unit 102 fixes the display position of first cursor 10 to the position indicated by the position data (step SA10).

After fixing the position of first cursor 10, control unit 102 causes imaging unit 106 to start capturing an image (step SA11). When the user looks at the display screen, imaging unit 106 captures an image of the user's face. Imaging unit 106 generates an image representing the user's face (hereinafter referred to as "face image"). Control unit 102 acquires the face image (step SA12). After acquiring the face image, control unit 102, using, for example, a technique disclosed in JP 10-39995 A, detects a visual line of the user to identify a position on the display screen viewed by the user (step SA13). It is to be noted that the technique for detecting a user's visual line may be any other conventional technique. For example, a user's visual line may be detected based on an image of the user's eyeballs captured by a camera mounted on the user's head.

Subsequently, control unit 102 determines whether the position viewed by the user remains unchanged over a predetermined time (for example, two seconds). In a case where the position viewed by the user has changed within the predetermined time (step SA14; NO), control unit 102 returns to step SA12. It is to be noted that the predetermined time may be more than or less than two seconds. On the other hand, in a case where control unit 102 makes a positive determination at step SA14, control unit 102 stores, in RAM 102C, data on the position (hereinafter referred to as "second position") that the user has viewed over the predetermined time (step SA15). Control unit 102 also causes display unit 1042 to display second cursor 11 at the position identified at step SA13 (step SA16).

Figure 9A:
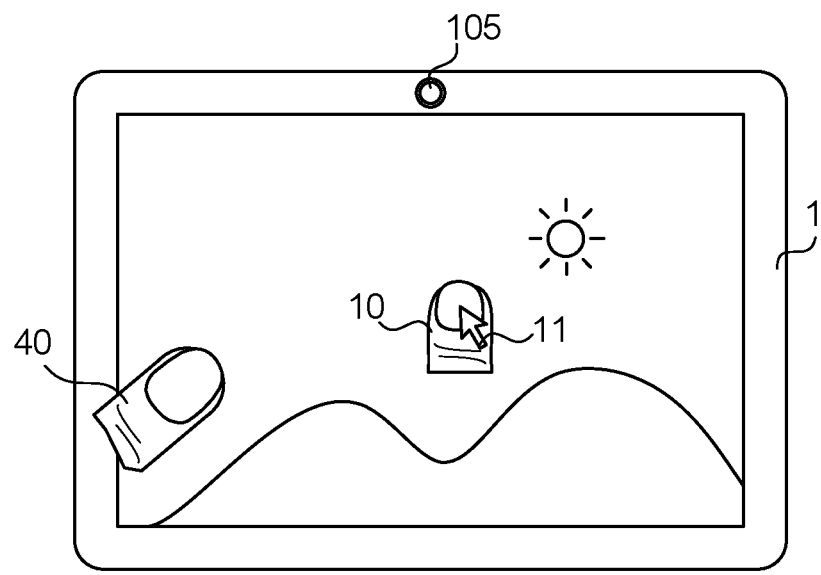
FIG. 9 is a diagram showing an example of a screen image displayed on display unit 1042.

For example, in a case where the user has viewed the position of first cursor 10, second cursor 11 is displayed over first cursor 10 as shown in FIG. 9(*a*). In another case where the user has viewed a position other than that of first cursor 10, second cursor 11 is displayed at the position other than that of first cursor 10 as shown in FIG. 9(*b*).

Subsequently, control unit 102 determines whether the position viewed by the user has changed from the second position. In a case where the position viewed by the user has changed from the second position (step SA17; YES), control unit 102 moves second cursor 11 (step SA18). A position to which second cursor 11 has moved from the second position will be referred to as "third position" for convenience of explanation. After moving second cursor 11, control unit 102 carries out a processing of enlarging or reducing an image other than first cursor 10 or second cursor 11 (step SA19). Specifically, in a case where the second position is within a predetermined range of the position of first cursor 10 as shown in FIG. 9(*a*), and second cursor 11 moves away from first cursor 10 as shown in FIG. 10(*a*), control unit 102 enlarges image G1, with the position of first cursor 10 as a center, according to a distance between the position of first cursor 10 and the third position, as shown in FIG. 10(a). Image G1 becomes larger as the distance between the position of first cursor 10 and the third position increases.

Figure 9B:
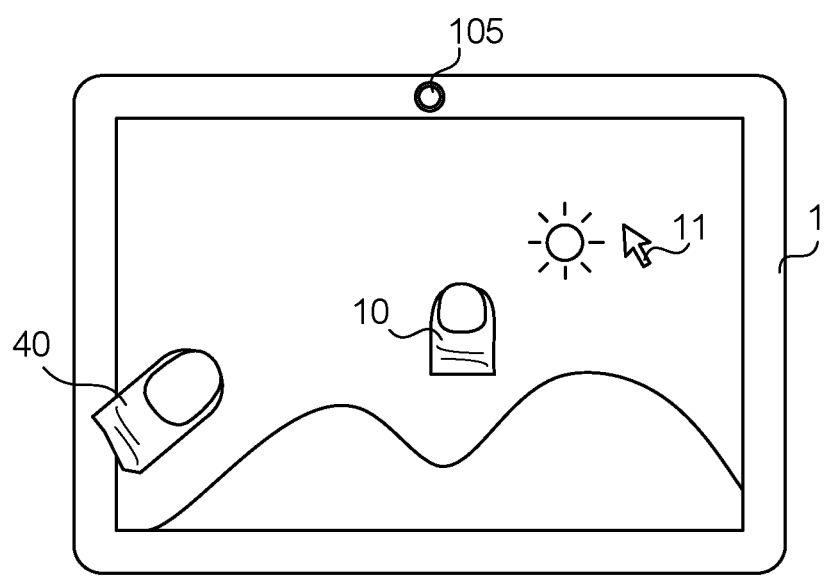
Figure 10A:
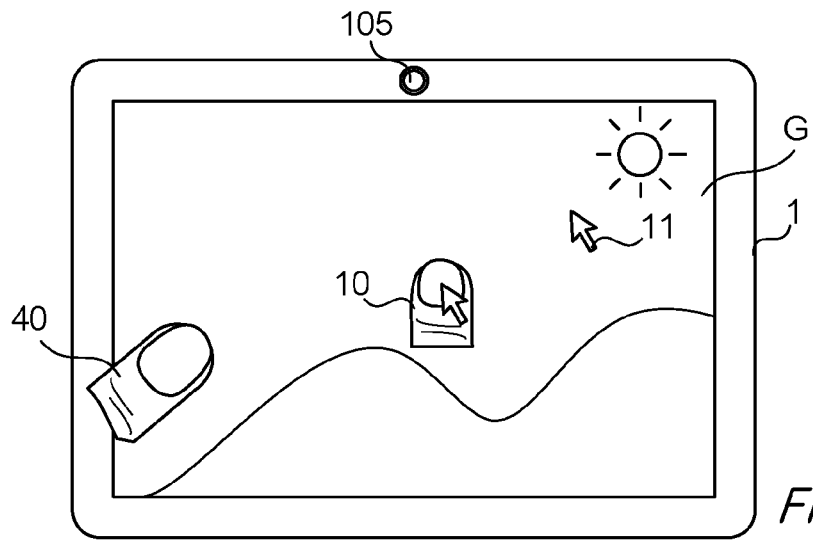
FIG. 10 is a diagram showing an example of a screen image displayed on display unit 1042.
Figure 10B:
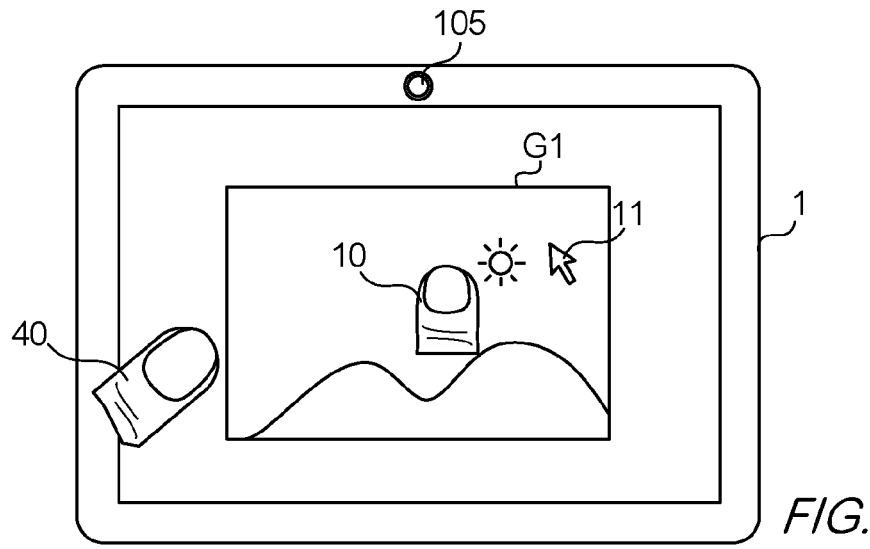

On the other hand, in a case where the second position is not within the predetermined range of the position of first cursor 10 as shown in FIG. 9(b), control unit 102 reduces image G1, with the position of first cursor 10 as a center, according to a distance between the position of first cursor 10 and the third position, as shown in FIG. 10(b). Image G1 becomes smaller as the distance between the position of first cursor 10 and the third position decreases.

Subsequently, control unit 102 determines whether the finger is in contact with touch screen 104A. If position data continues to be provided from touch screen 104A, and is acquired by control unit 102, the control unit makes a negative determination at step SA20, and returns to step SA18.

On the other hand, if position data cannot be acquired by control unit 102, the control unit determines that the finger has moved away from touch screen 104A (step SA20; YES). In a case where the positive determination is made at step SA20, control unit 102 fixes a degree, at the time, of enlargement or reduction of the image (step SA21). Control unit 102 also causes display unit 1042 to delete first cursor 10 and second cursor 11 (step SA22). After first cursor 10 and second cursor 11 are deleted, only the image, which has been enlarged or reduced by use of a finger and a visual line, is displayed on display unit 1042.

According to the present embodiment, where a reference point for enlarging or reducing an image is specified using a finger, and a degree of enlargement or reduction of an image is changed based on a visual line, a user is able to enlarge or reduce an image in a situation where s/he holds a tablet terminal with one hand, and the other hand is not free. In addition, in the present embodiment, a user is able to operate an image using one finger and a visual line, instead of more than one finger. Further, in the present embodiment, since an amount of movement of first cursor 10 is larger than that of a finger, a user is able to move first cursor 10 to a desired position on a screen in a situation where s/he has limited ability to move his/her finger(s).

Modifications

The present invention may be implemented in embodiments other than the above embodiment. For example, the above embodiment may be modified as described below. The above embodiment and the following modifications may be combined with each other.

A method for enlarging or reducing an image is not limited to the method employed in the above embodiment. For example, in a case where a user, after a position of first cursor 10 is fixed, views a position away from first cursor 10, a circle may be displayed, which has a radius of a distance between the viewed position and first cursor 10, and which is centered at the position of first cursor 10, and if the user views the inside of the circle, an image may be reduced with the position of first cursor 10 as a center; alternatively, if the user views the outside of the circle, an image may be enlarged with the position of first cursor 10 as a center.

In the above embodiment, a degree of enlargement or reduction of an image may vary depending on an application or content. For example, a degree of enlargement or reduction relative to an amount of movement of a visual line from a position of first cursor 10 may vary between a case where a web page is displayed by a web browser, and a case where a photograph is displayed by an application for displaying a photograph. In another instance, a degree of enlargement or reduction may vary between a case where a text page is displayed by a web browser, and a case where a page including photographs is displayed by a web browser.

In the above embodiment, a processing of enlarging or reducing an image is carried out using a finger and a visual line; however, a processing that can be carried out using a finger and a visual line is not limited to the processing of enlarging or reducing an image. For example, a position of first cursor 10 may be specified using a finger as in the case of the above embodiment, and an image may be rotated based on a visual line.

Figure 11:
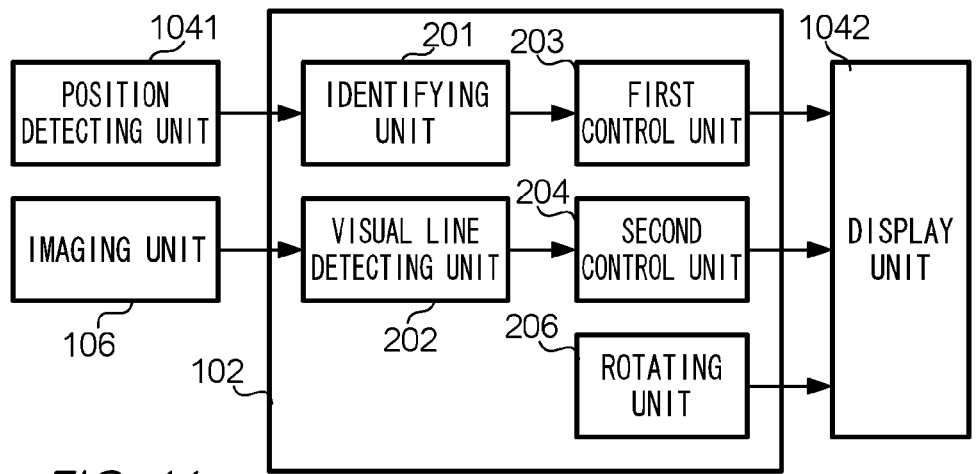
FIG. 11 is a block diagram showing functions of information-processing device 1 according to a modification.

FIG. 11 is a block diagram showing functions provided by control unit 102, according to the present modification. The present modification is different from the above embodiment in that rotating unit 206 is provided instead of third control unit 205.

Rotating unit 206, in a case where a position of first cursor 10 is fixed, and a direction of second cursor 11 as viewed from the fixed cursor changes, rotates an image displayed on display unit 1042 other than first cursor 10 or second cursor 11, according to an angle between a direction of second cursor 11 as viewed, prior to the change, from the fixed cursor and a direction of second cursor 11 as viewed, subsequent to the change, from the fixed cursor.

Figure 12:
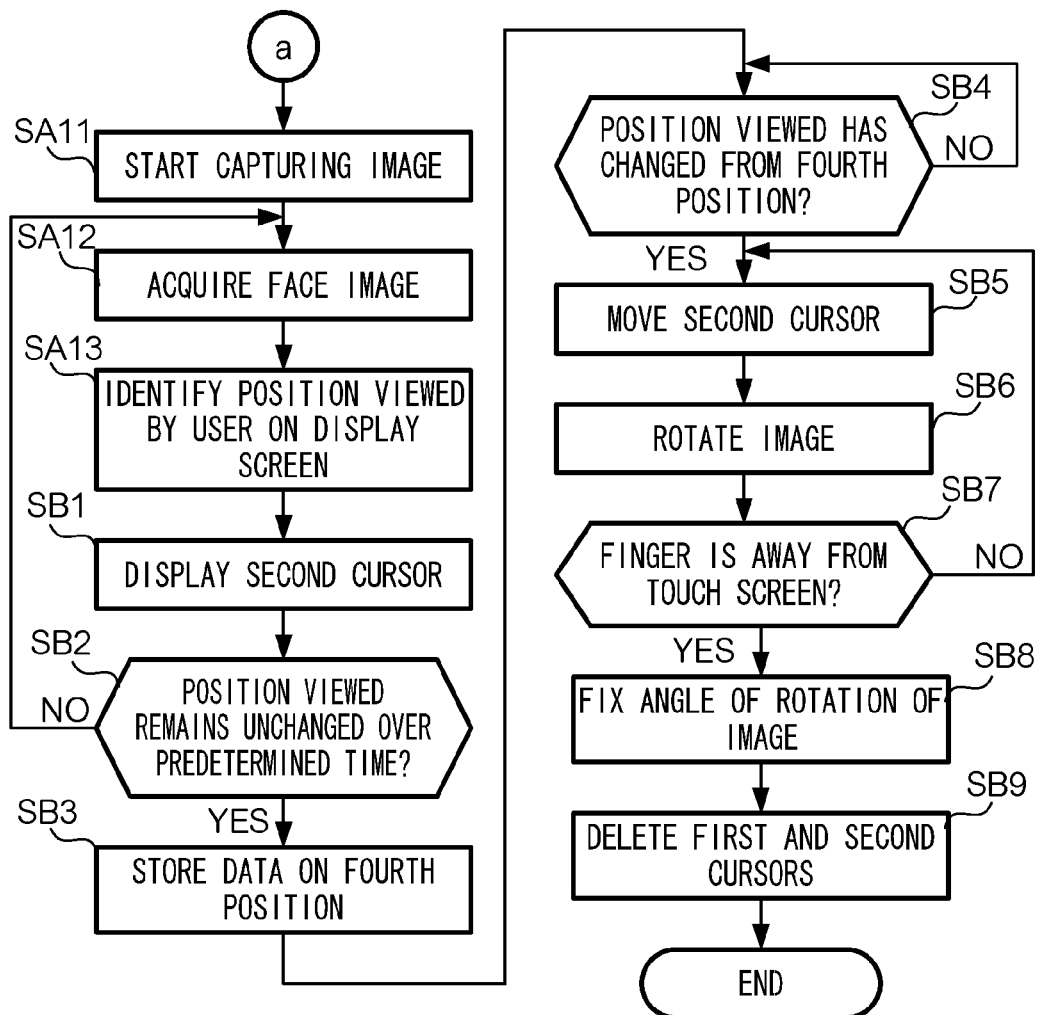
FIG. 12 is a flowchart showing a flow of processing performed by control unit 102 in a modification.

FIG. 12 is a flowchart showing a flow of processing performed by control unit 102, according to the present modification. In the present modification, a processing of steps SA1 to SA13 is the same as that of the above embodiment; however, a processing subsequent to step SA13 is different from that of the above embodiment, as shown in FIG. 12.

Figure 13:
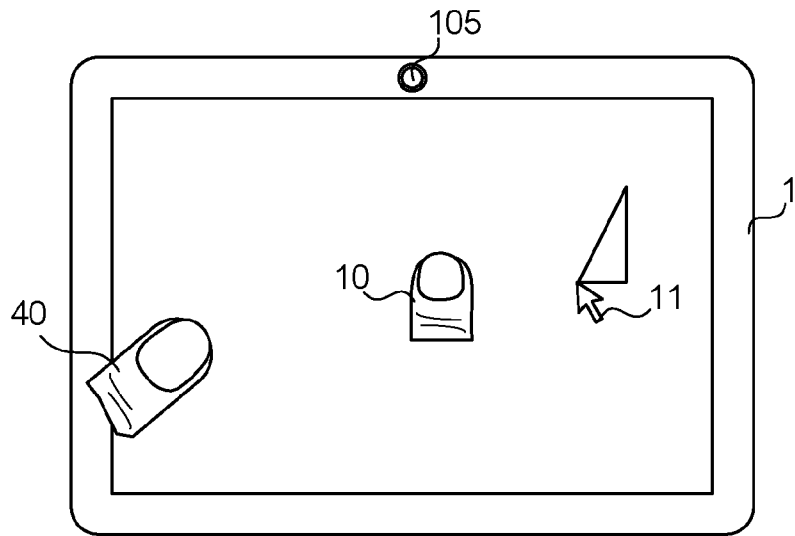
FIG. 13 is a diagram showing an example of a screen image displayed in a modification.

Control unit 102, after carrying out a processing of step SA13, causes display unit 1042 to display second cursor 11 at a position identified at step SA13 (step SB1). Subsequently, control unit 102 determines whether a position viewed by a user remains unchanged over a predetermined time period. If the position viewed by the user has changed within the predetermined time period (step SB2; NO), control unit 102 returns to step SA12. On the other hand, if control unit 102 makes a positive determination at step SB2, control unit 102 stores data on the position (hereinafter referred to as "fourth position") viewed by the user in RAM 102C (step SB3). For example, if the user has viewed a corner of a triangle image on the display as shown in FIG. 13 over the predetermined time period, second cursor 11 is displayed at the position of the viewed corner, and data on the position is stored as a fourth position.

Subsequently, control unit 102 determines whether the position viewed by the user has changed from the fourth position. In a case where the position viewed by the user has changed from the fourth position (step SB4; YES), control unit 102 moves second cursor 11 (step SB5). A position to which second cursor 11 has moved from the fourth position will be referred to as "fifth position" for convenience of explanation.

Figure 14:
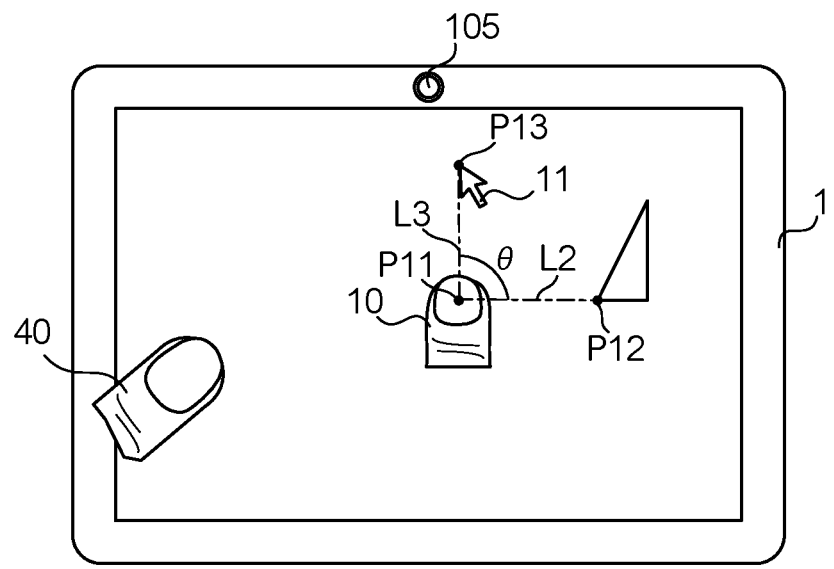
FIG. 14 is a diagram showing an example of a screen image displayed in a modification.
Figure 15:
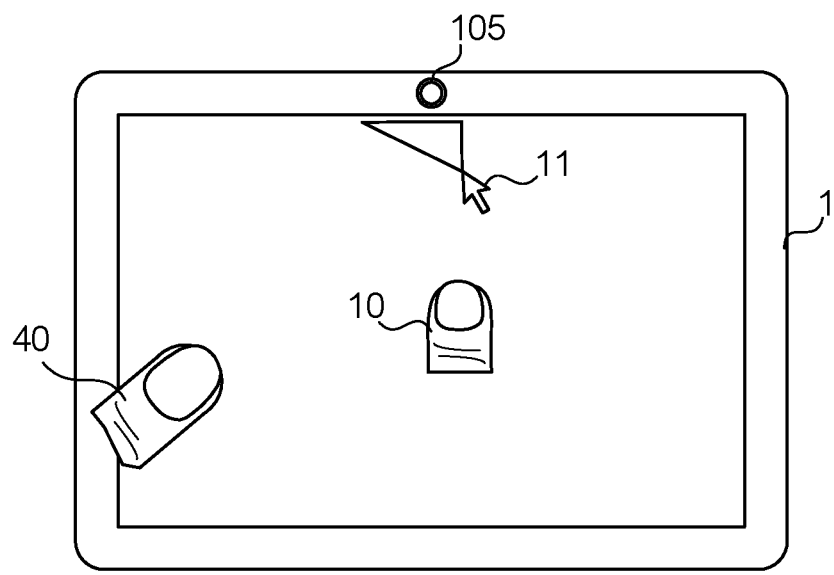
FIG. 15 is a diagram showing an example of a screen image displayed in a modification.

After moving second cursor 11, control unit 102 carries out a processing of rotating an image other than first cursor 10 or second cursor 11 (step SB6). Specifically, control unit 102 calculates angle θ between a line connecting the position of first cursor 10 and the fourth position, and a line connecting the position of first cursor 10 and the fifth position. For example, in a case where second cursor 11 has moved from the position shown in FIG. 13 to the position shown in FIG. 14, control unit 102 obtains line L2 connecting position P11 of first cursor 10 and fourth position P12, and line L3 connecting position P11 of first cursor 10 and fifth position P13, and calculates angle θ between line L2 and line L3. In other words, control unit 102 calculates angle θ between a direction of second cursor 11, which has not yet moved, as viewed from first cursor 10 and a direction of second cursor 11, which has moved, as viewed from first cursor 10. After calculating angle θ, control unit 102 rotates an image other than first cursor 10 or second cursor 11 around the position of first cursor 10 by angle θ. For example, in a case where an image shown in FIG. 14 is rotated around the position of first cursor 10 by angle θ, the triangle image shown on the display is rotated around the position of first cursor 10 by angle θ as shown in FIG. 15.

Subsequently, control unit 102 determines whether the finger is in contact with touch screen 104A. If position data continues to be provided from touch screen 104A, and is acquired by control unit 102, the control unit makes a negative determination at step SB7, and returns to step SB5.

On the other hand, if position data cannot be acquired by control unit 102, the control unit determines that the finger has moved away from touch screen 104A (step SB7; YES). At the time the positive determination is made at step SB7, control unit 102 fixes a rotational angle of an image (step SB8). Control unit 102 also causes display unit 1042 to delete first cursor 10 and second cursor 11 (step SB9). After first cursor 10 and second cursor 11 are deleted, only the image, which has been rotated by use of a finger and a visual line, is displayed on display unit 1042.

According to the present modification, where a reference point around which an image is rotated is specified by use of a finger, and a rotational angle of an image is changed based on a visual line, a user is able to rotate an image in a situation where s/he holds a tablet terminal with one hand, and the other hand is not free.

In the above embodiment, where a position of first cursor 10 is fixed, and thereafter enlargement or reduction of an image is performed, a position of first cursor 10 may not be fixed. For example, control unit 102 may display second cursor 11, without carrying out the processing of step SA10, and when a position viewed by a user remains unchanged for a predetermined time period, fix the position of second cursor 11. Subsequently, if a user's finger moves, control unit 102 may change a display position of first cursor 10, and enlarge or reduce an image with the position of second cursor 11 as a center according to a distance between first cursor 10 and second cursor 11. For example, in a case where a distance between first cursor 10 and second cursor 11 has become longer than that when second cursor 11 was fixed, control unit 102 may enlarge an image, and in a case where the distance has become shorter, control unit 102 may reduce an image. According to the present modification, an image may be enlarged or reduced using a finger and a visual line.

In the present invention, in a case where a position of first cursor 10 remains unchanged over a predetermined time, second cursor 11 may be displayed at a position viewed by a user. Subsequently, control unit 102 may change the position of first cursor 10 according to a position of a finger, and change the position of second cursor 11 according to a visual line. In the present modification, in a case where a distance between the cursors has become longer than that when second cursor 11 was displayed, an image may be enlarged, and in a case where a distance between the cursors has become shorter than that when second cursor 11 was displayed, an image may be reduced.

When an image is rotated, a position of first cursor 10 is fixed in advance; however, a position of first cursor 10 may not be fixed.

For example, control unit 102 may display second cursor 11, without carrying out the processing of step SA10, and when a position viewed by a user remains unchanged for a predetermined time period, fix the position of second cursor 11. Subsequently, if a user's finger moves, control unit 102 may change a display position of first cursor 10. Control unit 102 also calculates angle θ between a line connecting the position of first cursor 10 and the position of second cursor 11, and a line connecting the position of first cursor 10 when second cursor 11 was fixed and the position of second cursor 11. Subsequently, control unit 102 rotates an image on display around the position of second cursor 11 by the calculated angle θ. According to the present modification, an image may be rotated by use of a finger and a visual line.

In the above embodiment, a function of enlarging or reducing an image according to a finger's position and a visual line, and a function of rotating an image according to a finger's position and a visual line are provided by executing an operating system program. However, the functions may be provided by executing another program such as an application program, instead of the operating system program.

In the above embodiment, imaging unit 106 is built into information-processing device 1; however, imaging unit 106 may not be built into information-processing device 1. For example, a camera having a lens and a solid-state imaging sensor may be connected to information-processing device 1, and an image of a user's face may be captured using the camera. The camera may be mounted on an eyeglass frame, and an image of a user's face may be captured using the camera.

In the above embodiment, a method of displaying first cursor 10 may vary between a situation where first cursor 10 can be moved and a situation where first cursor 10 is fixed. For example, in a situation where first cursor 10 can be moved, first cursor 10 may be displayed in white, and in a situation where first cursor 10 is fixed, first cursor 10 may be displayed in a color other than white. Alternatively, in a situation where first cursor 10 is fixed, first cursor 10 may be displayed in a blinking manner, and in a situation where first cursor 10 can be moved, first cursor 10 may be displayed in a non-blinking manner. Alternatively, an area of first cursor 10 may be larger in a situation where first cursor 10 is fixed, than in a situation where first cursor 10 can be moved. Alternatively, a shape of first cursor 10 may vary between a situation where first cursor 10 can be moved and a situation where first cursor 10 is fixed. The foregoing modifications may be combined with each other.

In the above embodiment, information-processing device 1 is provided with a function of performing communication using a communication network; however, information-processing device 1 may not be provided with such a function. For example, information-processing device 1 may be an electronic book reader.

A program for providing functions described in the foregoing embodiments may be provided in the form of a computer-readable recording medium to be installed in information-processing device 1. The recording medium may be a magnetic recording medium, an optical recording medium, a magneto-optical recording medium, or a semiconductor memory. The magnetic recording medium may be a magnetic tape, or a magnetic disk such as an HDD (Hard Disk Drive) or an FD (Flexible Disk). The optical recording medium may be an optical disk. The program may be downloaded to information-processing device 1 via a communication line to be installed in information-processing device 1.

What is claimed is:

1. A display device, comprising:
 a display having a display surface on which an image is displayed;
 a computer processor configured to:
 detect a visual line of a user;
 identify a position on the display surface touched by the user;
 cause the display to display a first cursor at a position corresponding to the identified position;
 cause the display to display a second cursor at a position corresponding to the detected visual line; and
 when a distance between the position of the first cursor and the position of the second cursor has become longer, cause the display to enlarge an image, other than the first cursor or the second cursor, displayed by the display, and when the distance has become shorter, cause the display to reduce an image, other than the first cursor or the second cursor, displayed by the display.

2. The display device according to claim 1, wherein a degree of the enlargement or reduction changes depending on a content of the image, other than the first cursor or the second cursor, displayed by the display.

3. A display device, comprising:
 a display having a display surface on which an image is displayed;
 a computer processor configured to:
 detect a visual line of a user;
 identify a position on the display surface touched by the user;
 cause the display to display a first cursor at a position corresponding to the identified position identified;
 cause the display to display a second cursor at a position corresponding to the detected visual line; and
 in a case where the position of the first cursor or the second cursor is fixed, and a direction of the other cursor, as viewed from the fixed cursor, has changed, cause the display to display an image other than the first cursor or the second cursor, which image has been rotated according to an angle between a direction of the other cursor as viewed from the fixed cursor prior to the change, and a direction of the other cursor as viewed from the fixed cursor subsequent to the change.

4. A display method, comprising the steps of:
 detecting a visual line of a user;
 identifying a position on a display surface, on which an image is displayed, of a display, which position has been touched by a user;
 causing the display to display a first cursor at a position corresponding to the identified position;
 causing the display to display a second cursor at a position corresponding to the detected visual line; and
 when a distance between the position of the first cursor and the position of the second cursor has become longer, causing the display to enlarge an image, other than the first cursor or the second cursor, displayed by the display, and when the distance has become shorter, causing the display to reduce an image, other than the first cursor or the second cursor, displayed by the display.

5. A display method, comprising the steps of:
 detecting a visual line of a user;
 identifying a position on a display surface, on which an image is displayed, of a display, which position has been touched by a user;
 causing the display to display a first cursor at a position corresponding to the identified position;
 causing the display to display a second cursor at a position corresponding to the detected visual line; and
 in a case where the position of the first cursor or the second cursor is fixed, and a direction of the other cursor, as viewed from the fixed cursor, has changed, causing the display to display an image other than the first cursor or the second cursor, which image has been rotated according to an angle between a direction of the other cursor as viewed from the fixed cursor prior to the change, and a direction of the other cursor as viewed from the fixed cursor subsequent to the change.

6. A program stored on a non-transitory computer readable medium for causing a computer to execute the steps of:
 detecting a visual line of a user;
 identifying a position on a display surface, on which an image is displayed, of a display, which position has been touched by a user;
 causing the display to display a first cursor at a position corresponding to the identified position;
 causing the display to display a second cursor at a position corresponding to the detected visual line; and
 when a distance between the position of the first cursor and the position of the second cursor has become longer, causing the display to enlarge an image, other than the first cursor or the second cursor, displayed by the display, and when the distance has become shorter, causing the display to reduce an image, other than the first cursor or the second cursor, displayed by the display.

7. A program stored on a non-transitory computer readable medium for causing a computer to execute the steps of:
 detecting a visual line of a user;
 identifying a position on a display surface, on which an image is displayed, of a display, which position has been touched by a user;
 causing the display to display a first cursor at a position corresponding to the identified position;
 causing the display to display a second cursor at a position corresponding to the detected visual line; and
 in a case where the position of the first cursor or the second cursor is fixed, and a direction of the other cursor, as viewed from the fixed cursor, has changed, causing the display to display an image other than the first cursor or the second cursor, which image has been rotated according to an angle between a direction of the other cursor as viewed from the fixed cursor prior to the change, and a direction of the other cursor as viewed from the fixed cursor subsequent to the change.

* * * * *